(12) United States Patent
Lam et al.

(10) Patent No.: US 12,189,134 B2
(45) Date of Patent: Jan. 7, 2025

(54) COMPACT BEAM EXPANDER FOR VR/AR HEADSETS

(71) Applicant: Meta Platforms Technologies, LLC, Menlo Park, CA (US)

(72) Inventors: Wai Sze Tiffany Lam, Lynnwood, WA (US); Jian Xu, Redmond, WA (US); Wanli Chi, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/062,533

(22) Filed: Dec. 6, 2022

(65) Prior Publication Data

US 2024/0012261 A1 Jan. 11, 2024

Related U.S. Application Data

(60) Provisional application No. 63/359,652, filed on Jul. 8, 2022.

(51) Int. Cl.
*G02B 27/09* (2006.01)
*G02B 5/18* (2006.01)
*G02B 5/32* (2006.01)
*G02F 1/1335* (2006.01)

(52) U.S. Cl.
CPC ....... *G02B 27/0944* (2013.01); *G02B 5/1847* (2013.01); *G02B 5/32* (2013.01); *G02F 1/133504* (2013.01)

(58) Field of Classification Search
CPC ............ G02B 27/0172; G02B 27/0101; G02B 27/017; G02B 2027/0118; G02B 2027/012; G02B 2027/0121; G02B 2027/015; G02B 27/283; G02B 2027/0112; G02B 27/0977; G02B 27/10; G02B 5/32; G02B 5/1847; G02B 27/0944; G02F 1/133615; G02F 1/133504; B60R 2300/205; G03B 21/604
See application file for complete search history.

(56) References Cited

U.S. PATENT DOCUMENTS

| | | | | |
|---|---|---|---|---|
| 5,894,357 A | * | 4/1999 | Murakami | ............. H04N 1/486 358/515 |
| 2003/0147051 A1 | * | 8/2003 | Fujita | ................. G03B 21/2073 353/31 |
| 2014/0140654 A1 | * | 5/2014 | Brown | ............... G02B 27/4272 385/10 |

OTHER PUBLICATIONS

Bonneau J., "Ethiks: Using Ethereum to Audit a Coniks Key Transparency Log," International Conference on Financial Cryptography and Data Security, Springer, Aug. 31, 2016, pp. 95-105.
Cachin C., et al., "Introduction to Reliable and Secure Distributed Programming," Springer, 2011, 388 pages.

(Continued)

*Primary Examiner* — Mariam Qureshi
(74) *Attorney, Agent, or Firm* — McDermott Will & Emery LLP

(57) ABSTRACT

A beam expander for a display in an enhanced reality headset is provided. The beam expander includes a first optical element configured to receive a collimated beam input and to provide a first expanded beam in a first direction, and a second optical element configured to receive the first expanded beam in the first direction and to provide a second expanded beam in a second direction to a display for an enhanced reality headset. An enhanced reality headset and a method for making a beam expander therein with the above features are also provided.

10 Claims, 16 Drawing Sheets

(56) References Cited

OTHER PUBLICATIONS

Catalano D., et al., "Zero-knowledge Sets with Short Proofs," In Annual International Conference on the Theory and Applications of Cryptographic Techniques. Springer, 2008, pp. 433-450.

Chase M., et al., "Mercurial Commitments with Applications to Zero-knowledge Sets," in Annual International Conference on the Theory and Applications of Cryptographic Techniques. Springer, 2005, pp. 422-439.

Chase M. et al., "SEEMless: Secure End-to-End Encrypted Messaging with Less Trust," In Proceedings of the 2019 ACM SIGSAC conference on computer and communications security, Nov. 2019, pp. 1639-1656.

Cheng A., et al., "RAMP-TAO: Layering Atomic Transactions on Facebook's Online TAO Data Store," Proceedings of the VLDB Endowment, vol. 14, No. 12, 2021, pp. 3014-3027.

Corbett J.C., et al., "Spanner: Google's Globally Distributed Database," ACM Transactions on Computer Systems (TOCS), Aug. 2013, vol. 31, No. 3, 22 pages.

Dixon S., "Most Popular Global Mobile Messenger Apps as of Jan. 2022 based on Number of Monthly Active Users," Statista, Jul. 27, 2022], Retrieved from the Internet: URL: https://www.statista.com/statistics/258749/most-popular-global-mobile-messenger-apps/.

Dwork C., et al., "Consensus in the Presence of Partial Synchrony," Journal of the ACM (JACM), Apr. 1988, vol. 35, No. 2, pp. 288-323.

Fischer M.J., et al., "Impossibility of Distributed Consensus With One Faulty Process," Journal of the Association for Computing Machinery, Apr. 1985, vol. 32, No. 2, pp. 374-382.

Hu Y., et al., "Merkle2: A Low-Latency Transparency Log System," 2021 IEEE Symposium on Security and Privacy (SP), May 24-27, 2021, 19 pages.

Iqbal M., "Whatsapp Revenue and Usage Statistics (2023)," Business of Apps, Feb. 8, 2023, 08 pages. Retrieved from the Internet: URL: https://www.businessofapps.com/data/whatsapp-statistics/.

Kiromaru, et al., "Ordered Zero-Knowledge Set—oZKS," GITHUB, Aug. 31, 2022, 3 pages, Retrieved from the Internet: URL: https://github.com/microsoft/oZKS.

Lampson B.W., "Atomic Transactions," Distributed Systems-Architecture and Implementation, 1981, pp. 246-265.

"Regulation (EU) 2016/679 of the European Parliament and of the Council on the protection of natural persons with regard to the processing of personal data and on the free movement of such data, and repealing Directive 95/46/EC (General Data Protection Regulation)," Official Journal of the European Union, Apr. 27, 2016, 56 pages.

Leung D., et al., "Aardvark: A Concurrent Authenticated Dictionary With Short Proofs," Cryptology ePrint Archive, 2020, 13 pages, Retrieved from the Internet: URL: https://eprint.iacr. org/2020/975.

Malkhi D., et al., "Byzantine Quorum Systems," Distributed Computing, Oct. 1998, vol. 11, No. 4, pp. 203-213.

Marlinspike M., "Advanced Cryptographic Ratcheting," Signal, Nov. 26, 2013, 10 pages, Retrieved from the Internet: URL: https://signal.org/ blog/advanced-ratcheting/.

Marlinspike M., "WhatsApp's Signal Protocol integration is now complete," Signal, Apr. 5, 2016, 6 pages, Retrieved from the Internet: URL: https: //signal.org/blog/whatsapp-complete/.

Meiklejohn S., et al., "Think Global, Act Local: Gossip And Client Audits in Verifiable Data Structures," arXiv: 2011.04551, Nov. 9, 2020, 20 pages.

Melara M.S., et al., "CONIKS: Bringing Key Transparency to End Users," 24th USENIX Security Symposium (USENIX Security 15), Aug. 12-14, 2015, pp. 383-398.

Micali S., et al., "Zero-Knowledge Sets," 44th Annual IEEE Symposium on Foundations of Computer Science 2003 Proceedings, Oct. 11-14, 2003, 12 pages.

Nikitin K., et al., "CHAINIAC: Proactive Software-Update Transparency via Collectively Signed Skipchains and Verified Builds," 26th USENIX Security Symposium (USENIX Security 17), Aug. 16-18, 2017, pp. 1271-1287.

Peng D., et al., "Large-Scale Incremental Processing Using Distributed Transactions and Notifications," 9th USENIX Symposium on Operating Systems Design and Implementation (USENIX 2010), Oct. 4, 2010, 14 pages.

Sovran Y., et al., "Transactional Storage for Geo-Replicated Systems," Proceedings of the Twenty-Third ACM Symposium on Operating Systems Principles, Oct. 23, 2011, pp. 385-400.

Tomescu A., et al., "Authenticated Dictionaries with Cross-Incremental Proof (Dis)aggregation," Cryptology ePrint Archive, 2020, 24 pages, Retrieved from the Internet: URL: https://eprint.iacr.org/2020/1239.

Tomescu A., et al., "Catena: Efficient Non-Equivocation via Bitcoin," in 2017 IEEE Symposium on Security and Privacy (SP), May 22-26, 2017, 17 pages.

Tomescu A., et al., "Transparency Logs Via Append-Only Authenticated Dictionaries," Proceedings of the 2019 ACM SIGSAC Conference on Computer and Communications Security, Nov. 2019, pp. 1299-1316.

Tyagi N., et al., "VeRSA: Verifiable Registries with Efficient Client Audits from RSA Authenticated Dictionaries," Cryptology ePrint Archive, May 17, 2021, 41 pages.

Tzialla I., et al., "Transparency Dictionaries with Succinct Proofs of Correct Operation," IACR Cryptology ePrint Archive, Sep. 22, 2021, 20 pages.

\* cited by examiner ered reality headset.

COMPACT BEAM EXPANDER FOR VR/AR HEADSETS

CROSS-REFERENCE TO RELATED APPLICATIONS

The present disclosure is related and claims priority under 35 U.S.C. § 119(e) to U.S. Prov. Appln. No. 63/359,652, entitled COMPACT BEAM EXPANDER FOR VR/AR HEADSETS, filed on Jul. 8, 2022, to Wai Sze Tiffany Lam, et al., the contents of which are hereby incorporated by reference in their entirety, for all purposes.

BACKGROUND

Field

The present disclosure is related to beam expanders for use in displays of virtual reality/augmented reality (VR/AR) headsets. More specifically, the present disclosure is directed to beam optics that provide a two-dimensional (2D) expansion of an illuminating beam to cover a pixelated display in a VR/AR headset forming a colored image.

Related Art

Two-dimensional displays are illuminated in the back end by a coherent, collimated light source that desirably covers the entire area of the display. Displays for VR/AR headsets have the additional challenge that there is a constrained space in which to perform the optical operations with the illumination beam. In addition, multilayered displays for VR/AR applications typically have low transmission efficiency, which exacerbates the power usage of the display, in detriment of battery lifetime, which is critical for headset applications.

SUMMARY

In a first embodiment, a device includes a first optical element configured to receive a collimated beam input and to provide a first expanded beam in a first direction, and a second optical element configured to receive the first expanded beam in the first direction and to provide a second expanded beam in a second direction to a display for an enhanced reality headset.

In a second embodiment, a headset for enhanced reality applications includes a light source configured to provide a collimated beam, and a beam expander. The beam expander includes a first optical element configured to receive the collimated beam and to provide a first expanded beam in a first direction, and a second optical element configured to receive the first expanded beam in the first direction and to provide a second expanded beam in a second direction, and a display. The display includes a liquid crystal layer configured to receive the second expanded beam, and a pixelated electrode layer to activate a selected portion of the liquid crystal layer and provide a pixelated image to a user of the headset.

In a third embodiment, a method includes selecting a layer of a photosensitive material, the photosensitive material having a selected index rate of change per illumination exposure time, providing a first illuminating pattern on the layer of a photosensitive material for a first illumination exposure time, and providing a second illuminating pattern on the layer of the photosensitive material for a second illumination exposure time, wherein the first illumination exposure time and the second illumination exposure time add up to less than a saturated index change of the photosensitive material.

In yet other embodiments, a non-transitory, computer-readable medium stores instructions which, when executed by a processor, cause a computer to perform a method. The method includes selecting a layer of a photosensitive material, the photosensitive material having a selected index rate of change per illumination exposure time, providing a first illuminating pattern on the layer of a photosensitive material for a first illumination exposure time, and providing a second illuminating pattern on the layer of the photosensitive material for a second illumination exposure time, wherein the first illumination exposure time and the second illumination exposure time add up to less than a saturated index change of the photosensitive material.

In yet other embodiments, a system includes a first means to store instructions, and a second means to execute the instructions and cause the system to perform a method. The method includes selecting a layer of a photosensitive material, the photosensitive material having a selected index rate of change per illumination exposure time, providing a first illuminating pattern on the layer of a photosensitive material for a first illumination exposure time, and providing a second illuminating pattern on the layer of the photosensitive material for a second illumination exposure time, wherein the first illumination exposure time and the second illumination exposure time add up to less than a saturated index change of the photosensitive material.

These and other embodiments will become clear to one of ordinary skill in the art, in light of the following.

BRIEF DESCRIPTION OF THE FIGURES

In the figures, elements having the same or similar reference numeral have the same or similar features and attributes, unless explicitly stated otherwise.

DETAILED DESCRIPTION

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure.

General Overview

Displays for VR/AR headsets are challenged by the constrained space in which to perform optical operations with the illumination beam. In addition, multilayered displays for VR/AR applications typically have low transmission efficiency, which exacerbates the need for power usage of the display, in detriment of battery lifetime, which is critical for headset applications.

To resolve the above technical problems, embodiments disclosed herein include a 2D beam expander that uses a single, spatially limited illumination source as an input. The illumination source generates a beam that is folded (e.g., expanded) in two different directions, thus generating an expanded beam that may cover a full image provided to a display in a VR/AR headset. In addition to eliminating the need of large and complex illumination sources, the proposed approach also reduces power consumption by using highly efficient optical components and fewer illumination elements that may have a much higher luminosity than that of a single pixel in commonly used displays.

Example System Architecture

Figure 1:
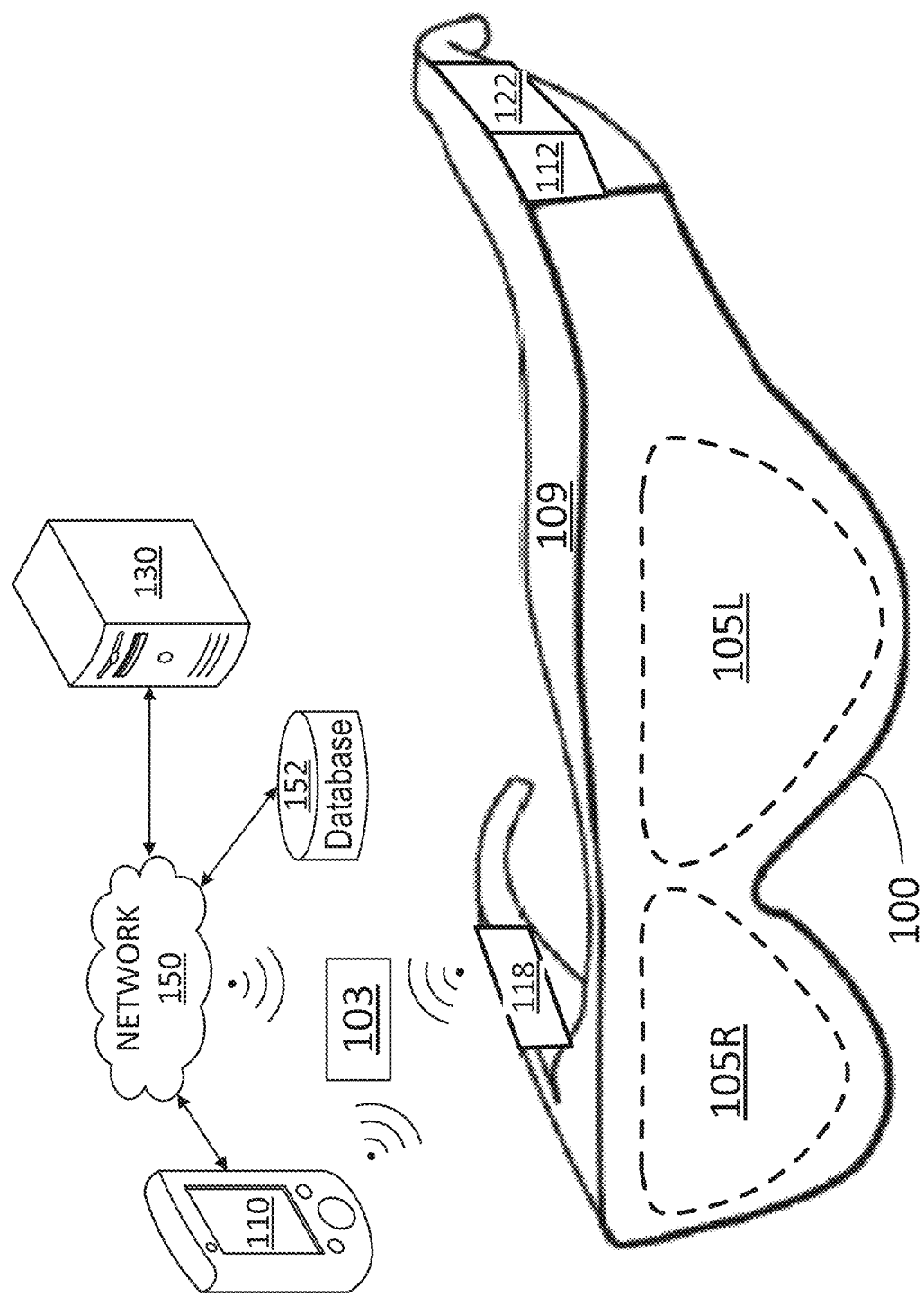
FIG. 1 illustrates a headset with a display including a compact beam expander for VR applications, according to some embodiments.

FIG. 1 illustrates a headset 100 with displays 105L and 105R (hereinafter, collectively referred to as "displays 105") including a compact beam expander for VR applications, according to some embodiments. Headset 100 includes a frame 109, and displays 105L and 105R for the left and right eyepieces.

In some embodiments, headset 100 may include a processor circuit 112 and a memory circuit 122. Memory circuit 122 may store instructions which, when executed by processor circuit 112, cause headset 100 to execute one or more steps in methods as disclosed herein. In addition, headset 100 may include a communications module 118. Communications module 118 may include radio-frequency software and hardware configured to wirelessly communicate processor 112 and memory 122 with an external network 150, a remote server 130, a database 152 or a mobile device 110 handled by the user of headset 100. Headset 100, mobile device 110, server 130 and database 152 may exchange commands, instructions, and data, via a dataset 103, through network 150. Accordingly, communications module 118 may include radio antennas, transceivers, and sensors, and also digital processing circuits for signal processing according to any one of multiple wireless protocols such as Wi-Fi, Bluetooth, Near field contact (NFC), and the like. In addition, communications module 118 may also communicate with other input tools and accessories cooperating with headset 100 (e.g., handle sticks, joysticks, mouse, wireless pointers, and the like). Network 150 may include, for example, any one or more of a local area network (LAN), a wide area network (WAN), the Internet, and the like. Further, the network can include, but is not limited to, any one or more of the following network topologies, including a bus network, a star network, a ring network, a mesh network, a star-bus network, tree or hierarchical network, and the like.

Figure 2A:
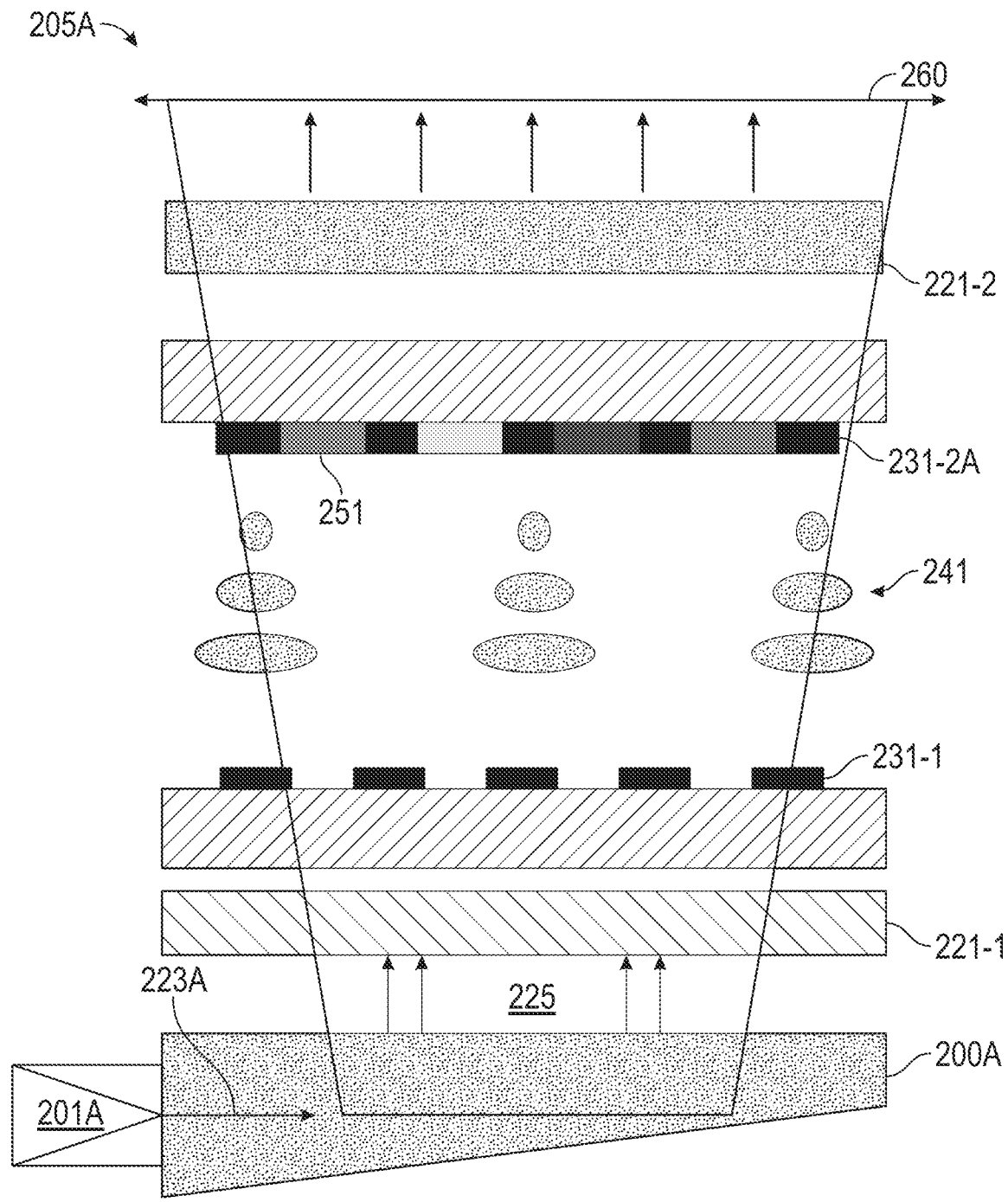
FIGS. 2A-2B illustrate cross-sectional views of displays in a VR/AR headset, according to some embodiments.
Figure 2B:
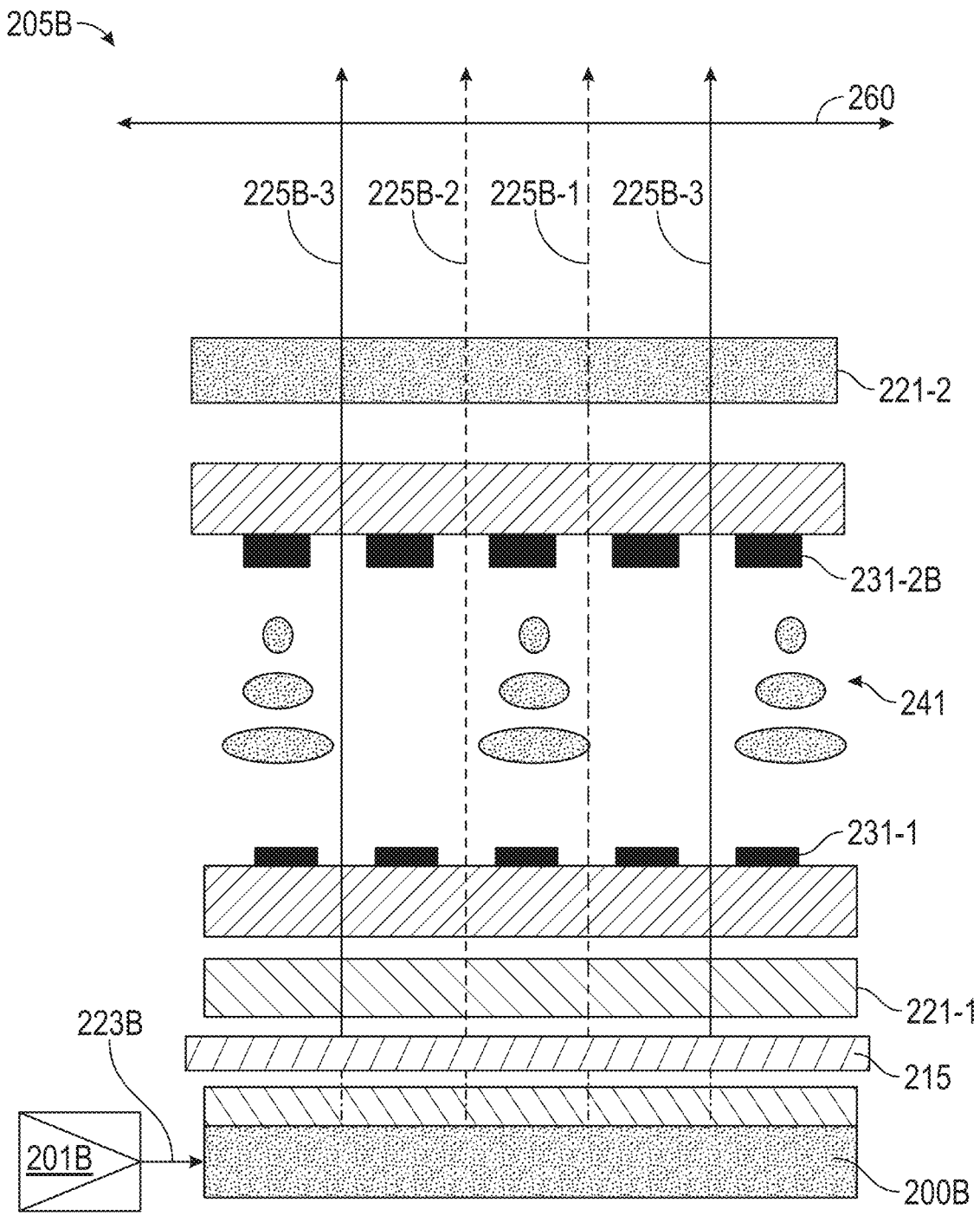

FIGS. 2A-2B illustrate partial cross-sectional views of displays 205A and 205B (hereinafter, collectively referred to as "displays 205") in a VR/AR headset, according to some embodiments. Light sources 201A (e.g., a while light emitting diode LED) and red-green-blue (RGB) laser 201B (hereinafter, collectively referred to as light sources 201) provide illumination beams 223A and 223B (hereinafter, collectively referred to as "illumination beams 223") at the bottom of the assembly into an expanded beam 225.

A liquid guide panel (LGP) including a planar waveguide forms a beam expander 200A, and a grating and a phase plate 215 form a beam expander 200B (hereinafter, collectively referred to as "beam expanders 200"). Beam expanders 200 generate expanded beam 225 from illumination beams 223. Displays 205 include layers 231-1 (e.g., a thin-film transistor layer) and 231-2A and 231-2B (e.g., a common electrode, hereinafter, collectively referred to as "common electrode layers 231-2"). Hereinafter, thin film transistor layer 231-1 and common electrode layers 231-2 will be collectively referred to as "pixelated layers 231." Pixelated layers 231 convert expanded beam 225 in a multi-colored image (e.g., RGB) for display to a user of the headset. At least one of pixelated layers 231 may include a transparent conductive material such as indium tin oxide, and the like. At least one of pixelated layers 231 may include a pixelated mask such that different pixels are activated at different voltages, thus providing a pixelated image through the display in the headset.

A liquid crystal (LC) layer 241 is sandwiched between two polarization layers 221-1 and 221-2. Pixelated layers 231 generate an electric field that varies from pixel to pixel and modulates the intensity throughput of expanded beam 225 in displays 205 in a two-dimensional (2D) pattern. Accordingly, expanded beam 225 goes through displays 205 forming a color image for the user of the headset. In some embodiments, displays 205 include an optical element (VR optics) 260 to provide the pixelated image through an eyebox delimiting a pupil area of a user of the headset. Optical element 260 may include a multi-lens array (MLA), a lens, a pancake lens, a prism, a mirror or beamsplitter, or any combination thereof.

In some embodiments, display 205A includes a filter layer 251 including, for each pixel in the pixelated image, at least three different color filters (RGB). In some embodiments, filter layer 251 is embedded in common electrode layer 231-2A. Accordingly, pixelated layer 231 may have a refined pixelation such that for each pixel in a 2D image, there are three different sub-pixels feeding LC layer 241 to provide a color gamut for the 2D image.

Display 205B may include a phase plate (or MLA) 215, which in combination with a grating 200B separates light 223B in three expanded beams 225B-1 (blue, B), 225B-2 (green, G), and 225B-3 (red, R, hereinafter, collectively referred to as "expanded beams 225B"). Expanded beams 225 are directed into different portions of pixelated layer 231. Common electrode layer 231-2B in display 205B may form a 2D mask configured to block two of the three different colors (RGB) for each pixel in the pixelated image. Accordingly, each one of expanded beams 225B is blocked in a different pattern, to form a colored, 2D image. Note that, while the figure shows only one expanded beam 225B-1 and 225B-2, and two expanded beams 225B-3, display 205B may include thousands of portions as the one illustrated, extended over the full 2D area of the image.

Figure 3A:
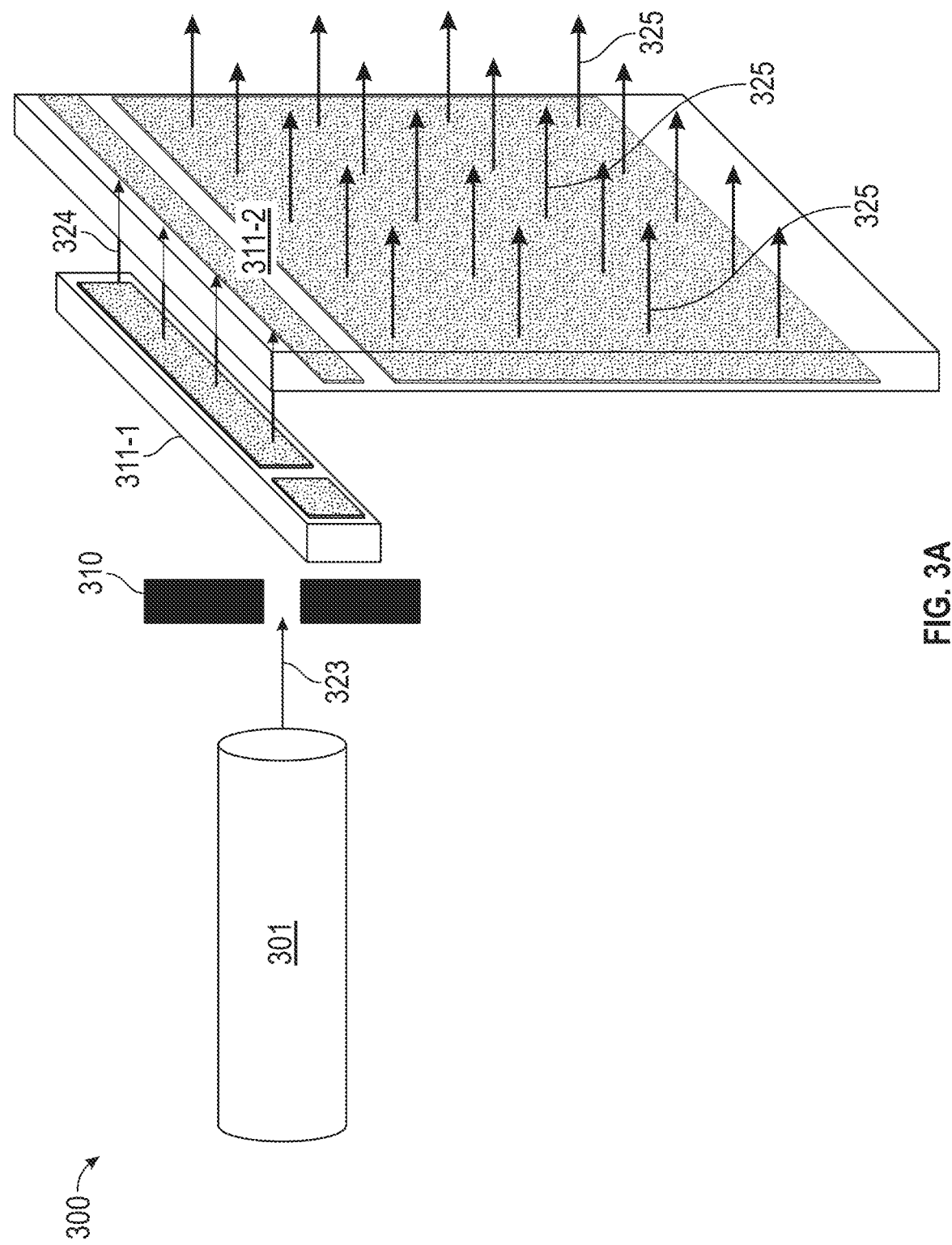
FIGS. 3A and 3B illustrate a 2D beam expander using surface relief gratings and planar waveguides, according to some embodiments.
Figure 3B:
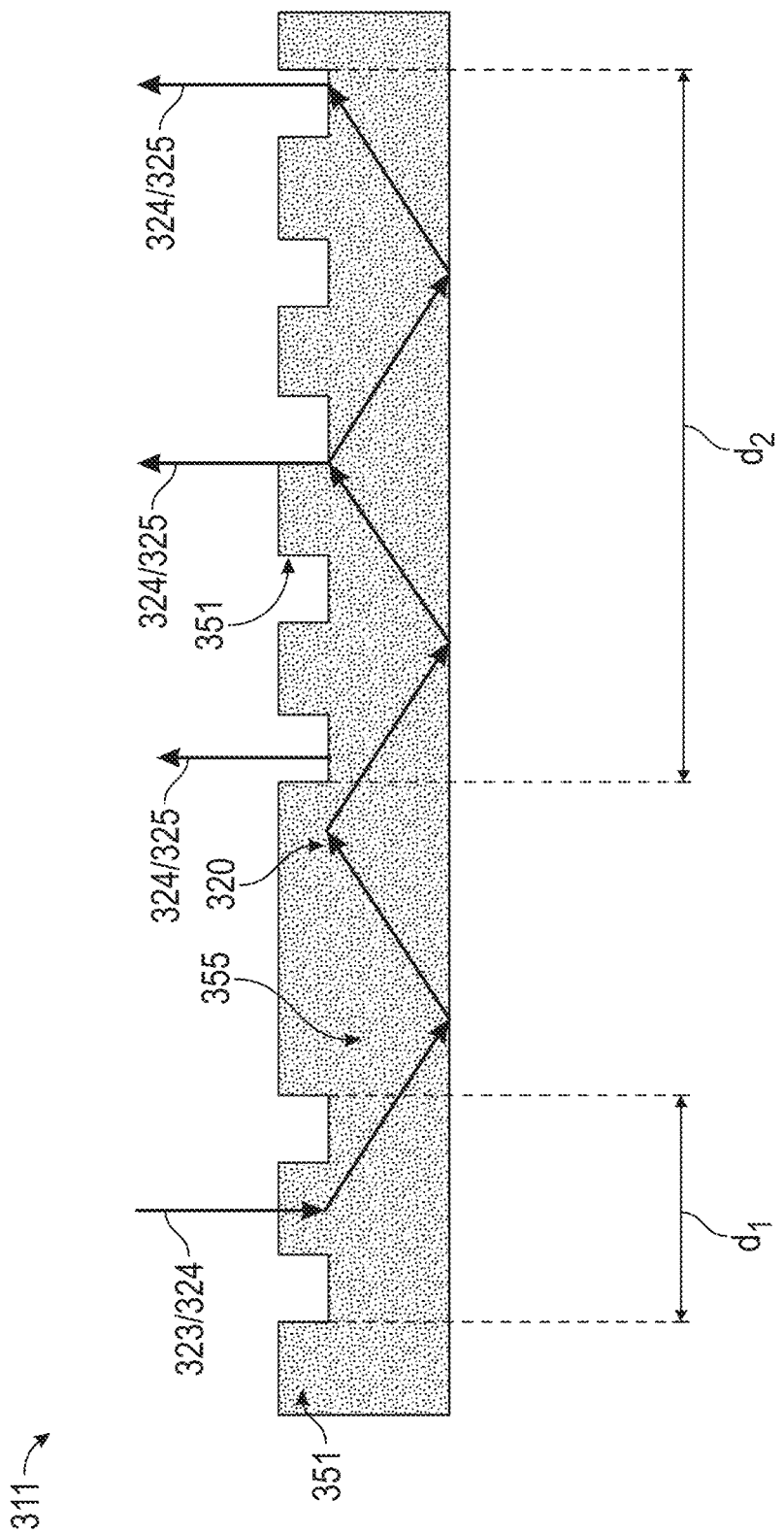

FIGS. 3A and 3B illustrate a 2D beam expander 300 using surface relief gratings 351 and planar waveguides 355 in a first and second optical elements 311-1 and 311-2 (hereinafter, collectively referred to as "optical elements 311"), respectively, according to some embodiments. A light source 301 generates an incoming beam 323 (e.g., collimated) that is spatially filtered by a pinhole or collimator 310. Optical elements 311 expand incoming beam 323 in two different directions, to generate a 2D-expanded beam 325 that is directed to a display of a VR/AR headset (cf. displays 105 and 205). In some embodiments, the 2D expansion occurs in two stages: first optical element 311-1 expands incoming beam 323 into a 1D-expanded beam 324. 1D-expanded beam 324 is provided to second optical element 311-2, which applies a second beam expansion to generate 2D-expanded beam 325.

Optical element 311-1 includes an elongated strip about the thickness of an incoming collimated beam 323. In some embodiments, collimated beam 323 impinges almost normally upon optical element 311-1, which has a surface relief grating 351 that couples collimated beam 323 into a planar waveguide formed by the strip. As an in-coupled light 320 propagates through optical elements 311, a surface relief grating 351 on the other side couples at least a portion of the light out, in a normal direction. This effectively expands beams 323/324 along the direction of the length of the strip (1D-expansion) from a length $d_1$ to a length $d_2$. Further, second optical element 311-2 may be formed as a two-dimensional extension of first optical element 311-1 and performs a similar operation (e.g., preserves the expanded dimension, and expands a second dimension of 1D-expanded beam 324). Accordingly, surface relief grating 351 along an input edge of second optical element 311-2 couples the 1D-expanded beam 324 to propagate through the planar waveguide in a substantially orthogonal direction (down, in FIG. 3A, right in FIG. 3B). As the 1D-expanded beam 324 progresses, an output surface relief grating 351 on a surface of second optical element 311-2 directs a doubly expanded (2D-expanded) beam 325 substantially parallel (or antiparallel) to collimated beam 323.

FIG. 3A is a perspective view of beam expander 300, with optical elements 311 receiving incoming collimated beam 323 and expanding it in two directions, to generate 2D-expanded beam 325.

FIG. 3B is a cross sectional view of either one of optical elements 311, illustrating a propagating beam 320 within planar waveguide 355 and coupling an input beam 323/324 into an expanded beam 324/325 (corresponding to optical elements 311-1/311-2, respectively).

FIGS. 4A-4D illustrate 2D beam expanders 400A, 400B, 400C, and 400D (hereinafter, collectively referred to as "beam expanders 400") using blazed angle gratings 411-1, 411-2, 411B-1, and 411D-2 (collectively referred to, hereinafter, as "blazed angle gratings 411"), according to some embodiments. A light source 401 (e.g., an RGB laser or a white LED) is coupled to collimator 410 and directs an input beam 423 towards first reflective gratings 411-1, 411B-1, 411C-1 and 411D-1, or transmissive grating 411C-1 (hereinafter, collectively referred to as "gratings 411-1") at a grazing angle 415-1 (incoming direction) such that input beam 423 covers a wide area of grating 411-1. Gratings 411-1 convert incoming beam 423 into a first expanded beam 424 and direct it towards a 2D grating 411-2. In some embodiments, 2D grating 411-2 is a reflective grating, blazed at an angle 415-2 such that incoming beam 423 is reflected in a direction substantially perpendicular to grating 411-2. Grating 411-2 provides a 2D-expanded beam 425 in a second direction onto a pixelated display of a VR/AR headset (cf. displays 105 and 205). Grazing angles 415-1 and 415-2 will be collectively referred to, hereinafter, as "grazing angles 415."

Figure 4A:
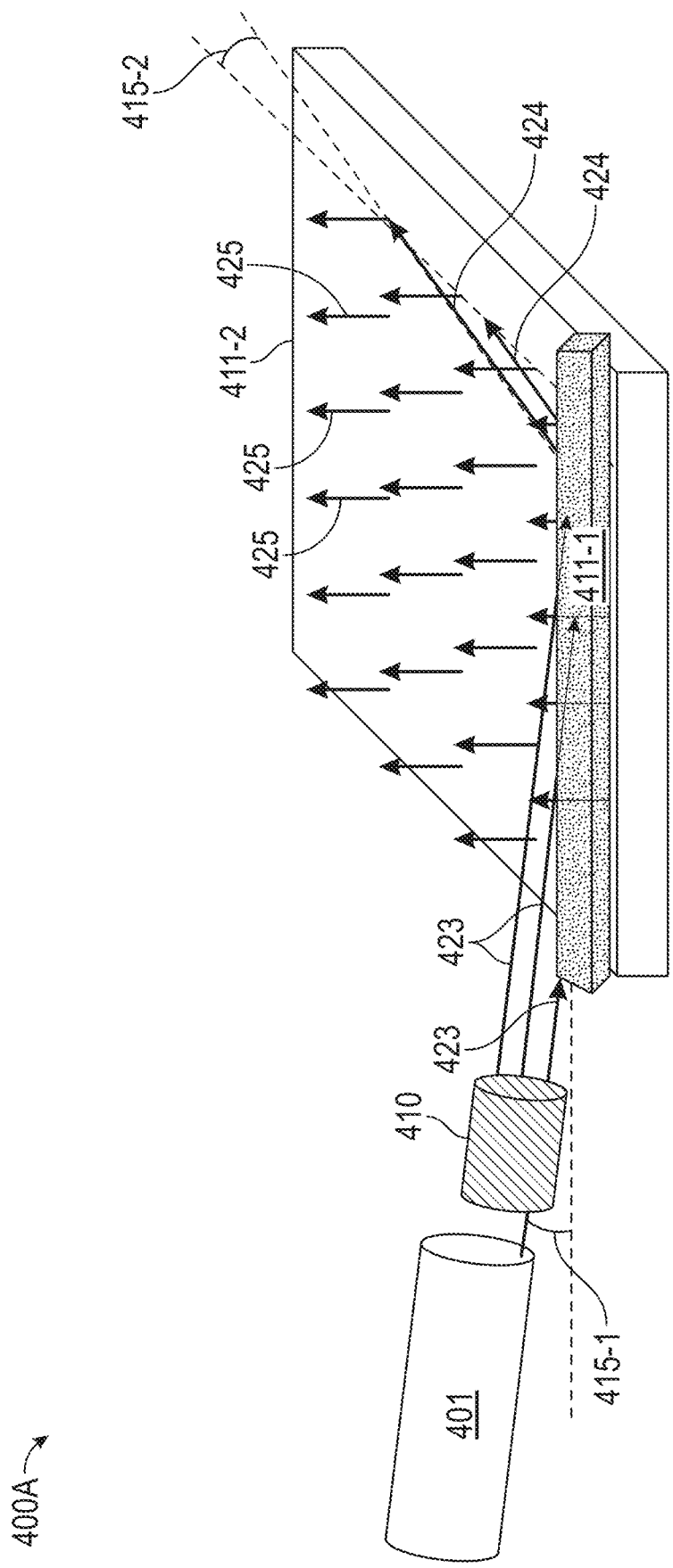
FIGS. 4A-4D illustrate a 2D beam expander using blazed angle gratings, according to some embodiments.

FIG. 4A illustrates a perspective view of beam expander 400A including blazed gratings 411 to convert collimated beam 423 into a 1D-expanded beam 424 and direct it to blazed angle grating 411-2. Blazed angle grating 411-2 converts 1D-expanded beam 424 into a 2D-expanded beam 425.

Figure 4B:
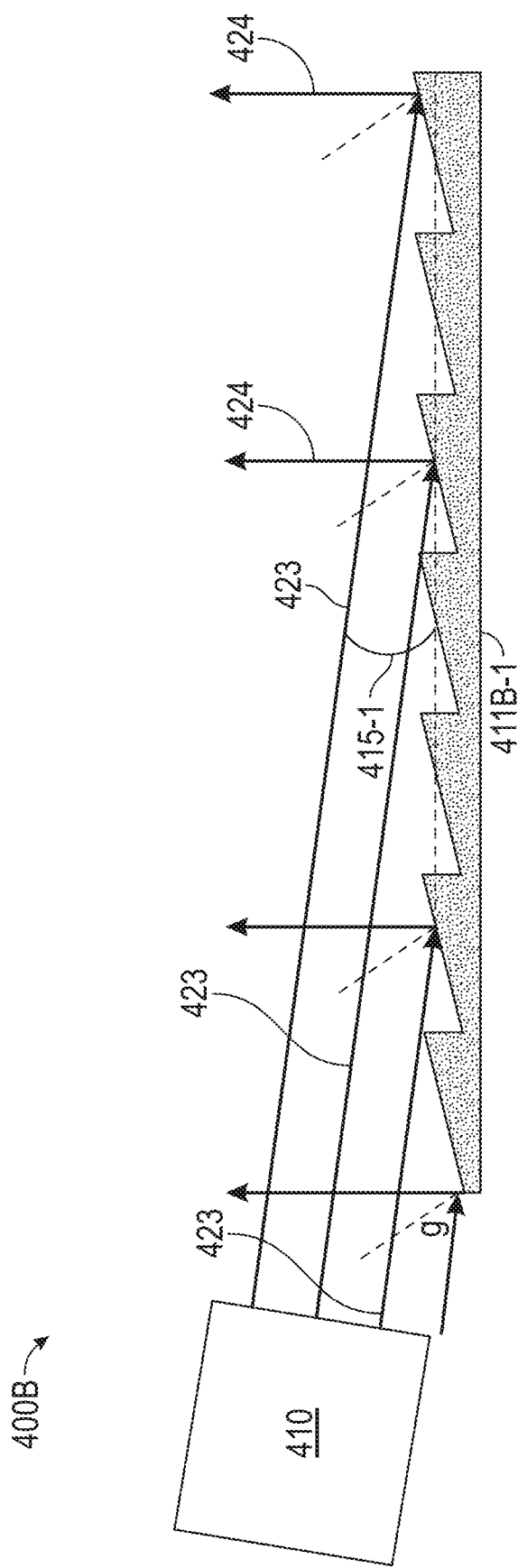

FIG. 4B illustrates a cross-sectional view of beam expander 400B including blazed grating 411B-1 in reflection mode. Accordingly, grating 411B-1 may be blazed at angle 415-1 to maximize the efficiency of directing incoming beam 423 into 1D-expanded beam 424.

Figure 4C:
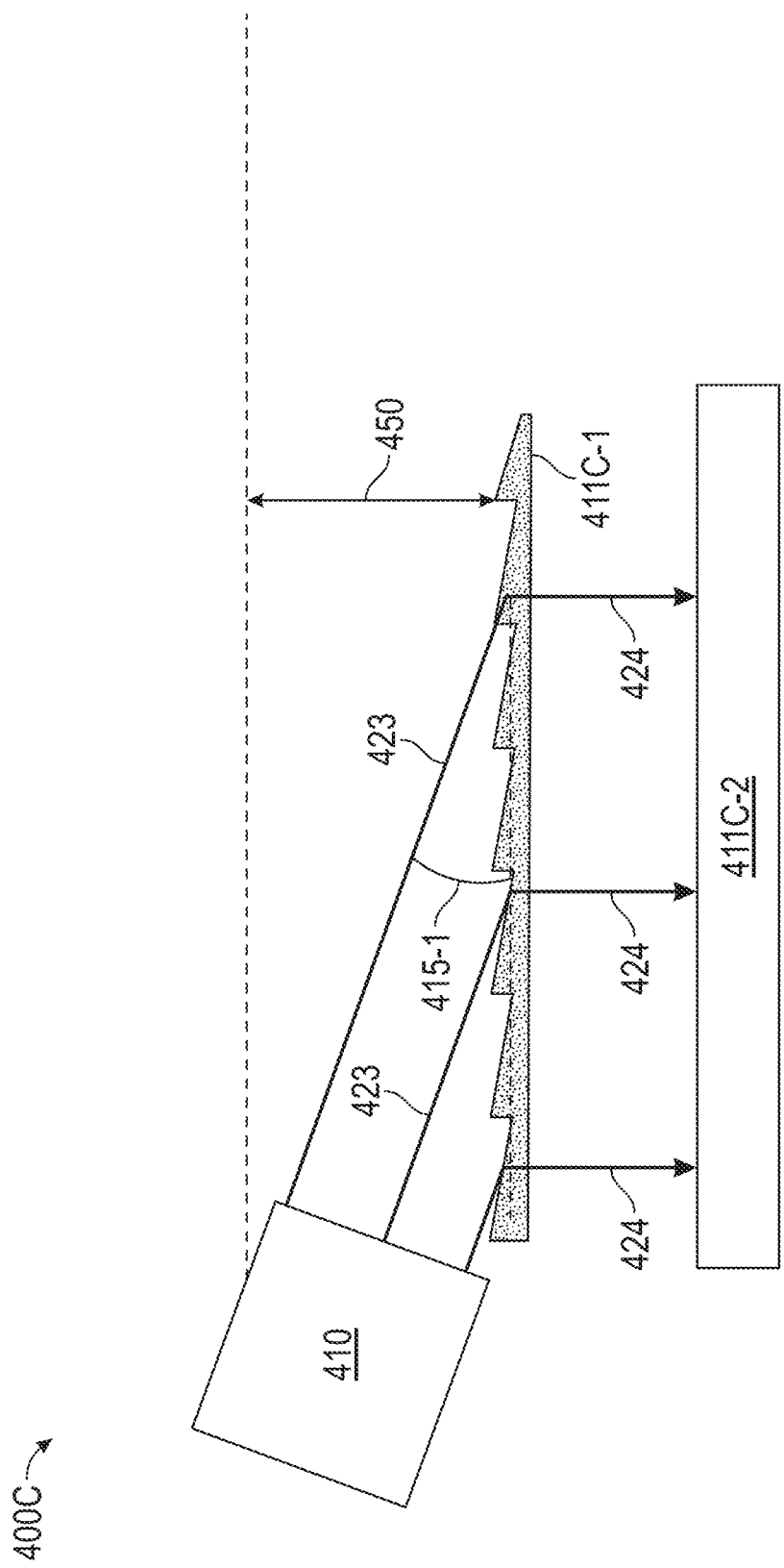

FIG. 4C illustrates a cross-sectional view of beam expander 400C including grating 411C-1 in transmission mode. Accordingly, grating 411C-1 may be blazed to maximize the efficiency of directing collimated beam 423 into 1D-expanded beam 424, in transmission mode, and directed to a second optical element 411C-2 (which could be another blazed grating or a surface relief grating formed on a planar waveguide, as disclosed herein).

Figure 4D:
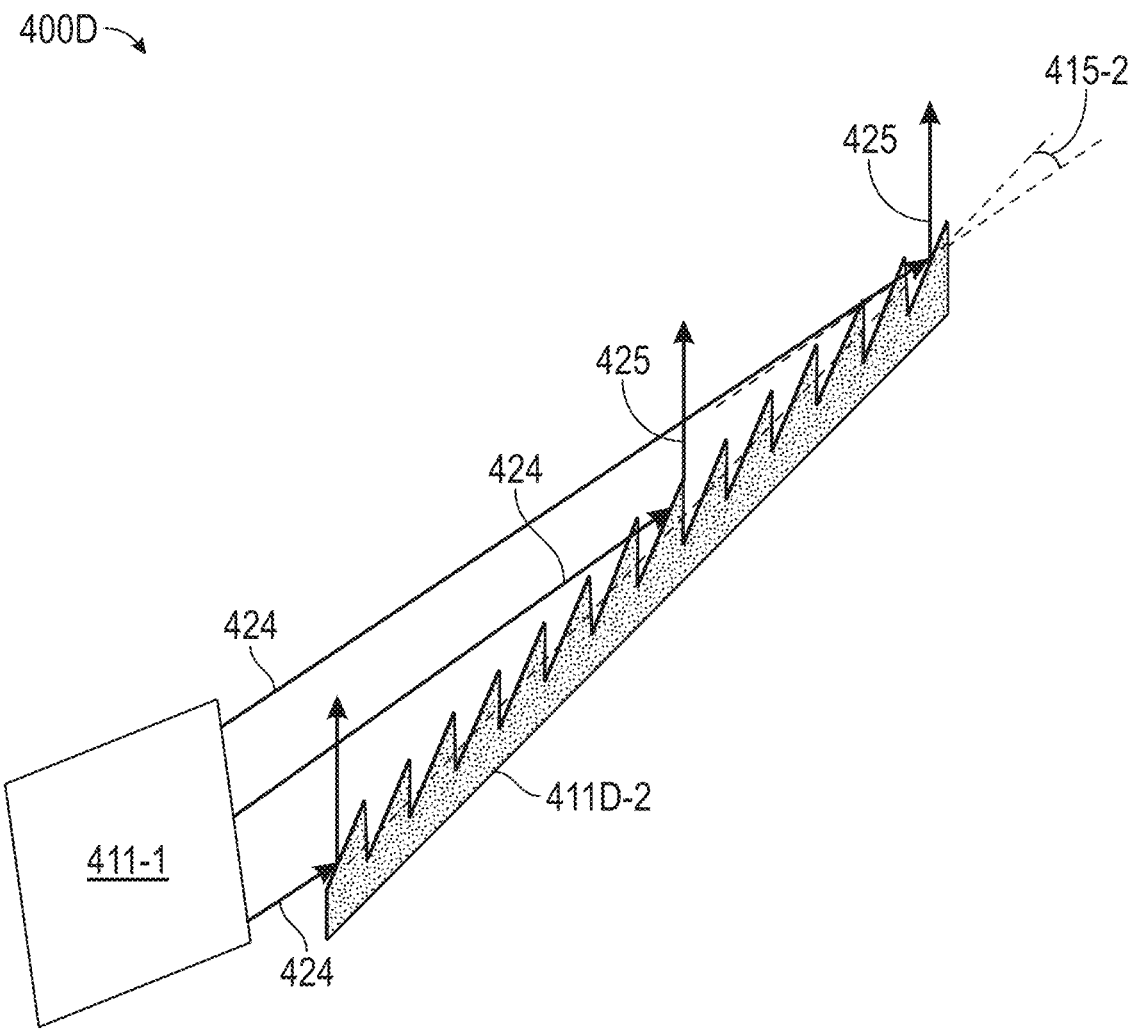

FIG. 4D illustrates a cross-sectional view of beam expander 400D including blazed grating 411D-2 in reflection mode. Accordingly, blazed grating 411D-2 may be blazed at angle 415-2 to maximize the output efficiency of 2D-expanded beam 425.

Figure 5A:
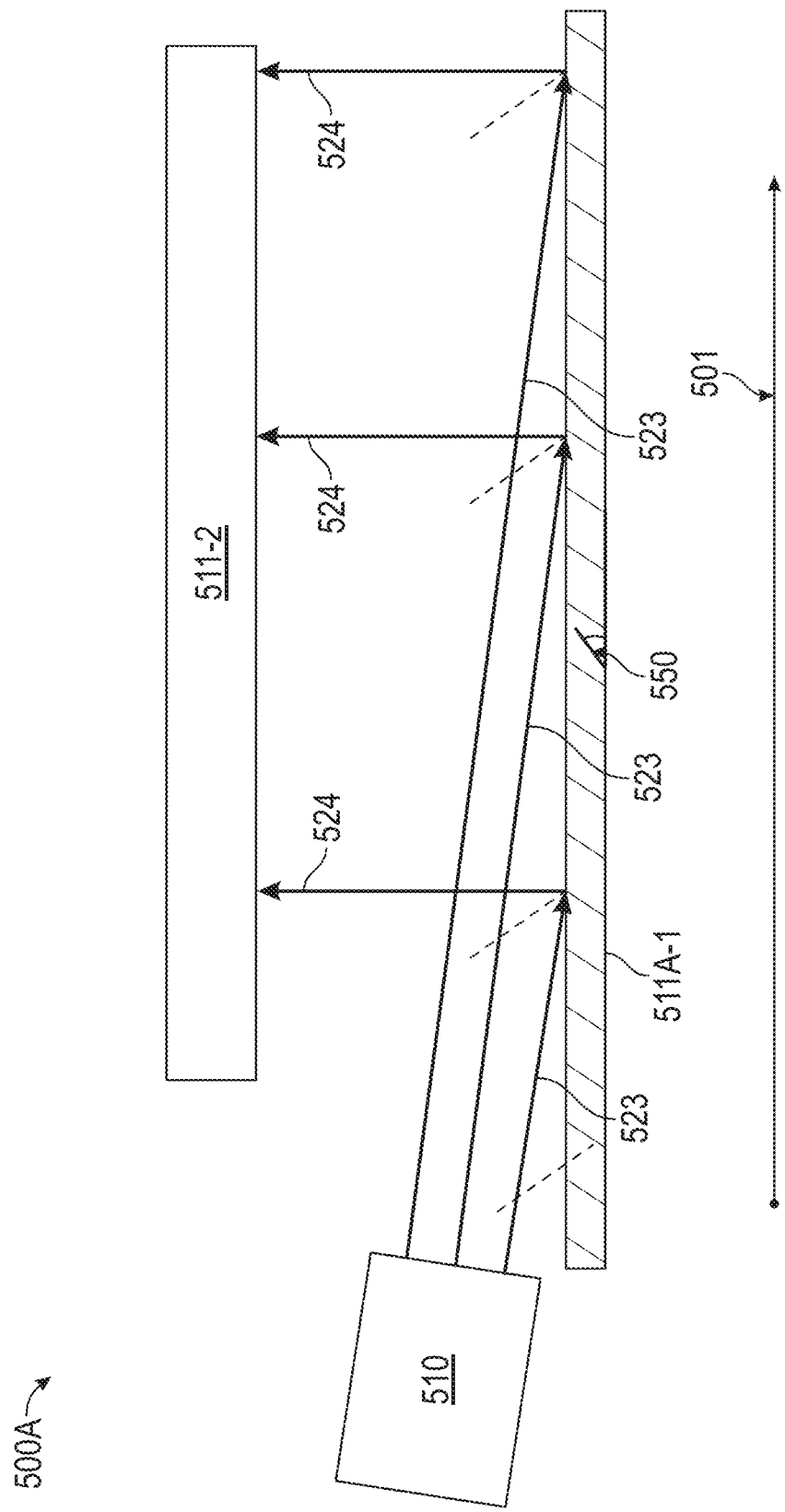
FIGS. 5A-5B illustrate a 2D beam expander using holographic gratings, according to some embodiments.
Figure 5B:
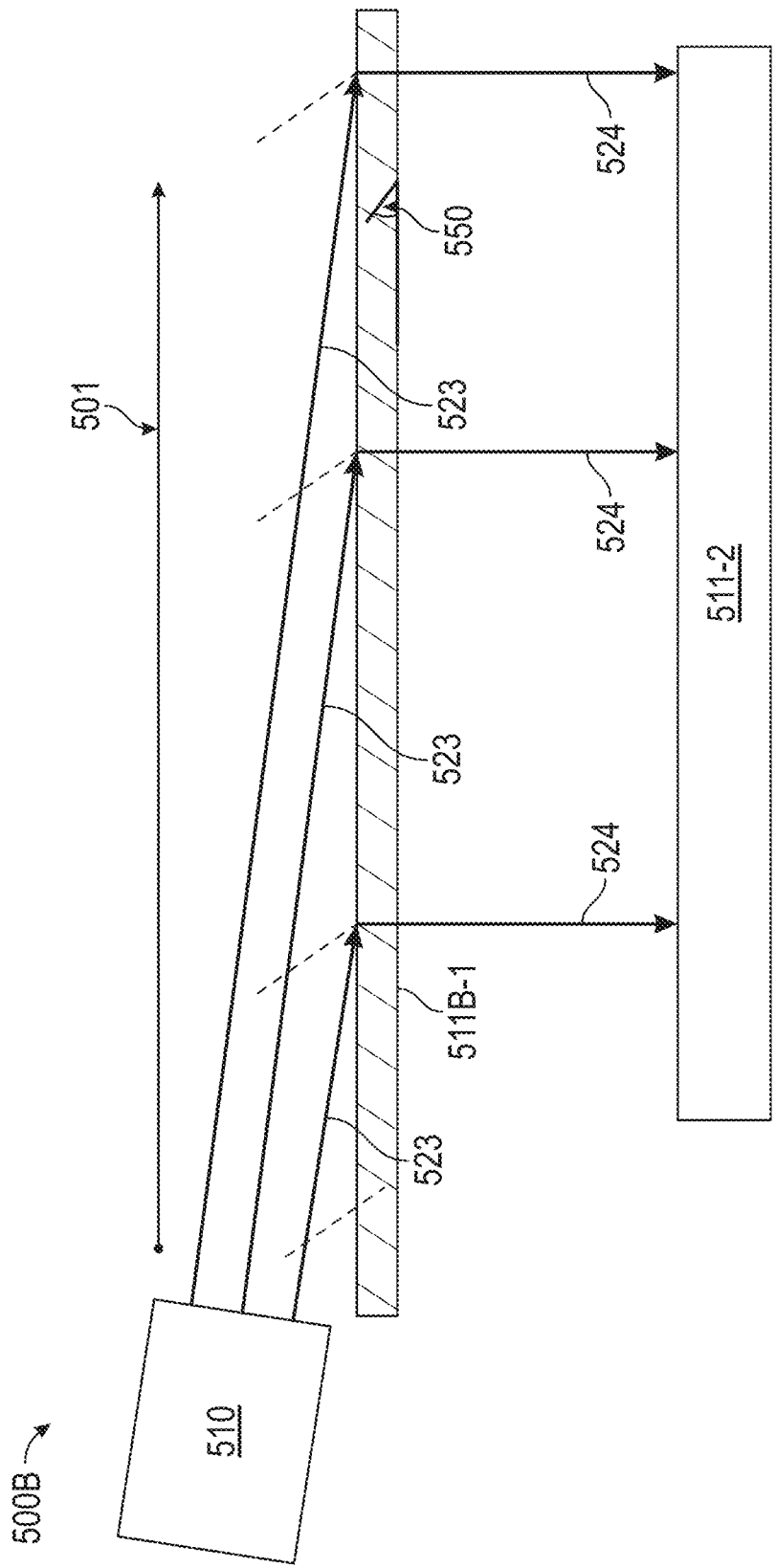

FIGS. 5A-5B illustrate 2D beam expanders 500A and 500B (hereinafter, collectively referred to as "beam expanders 500") using holographic gratings 511A-1 and 511B-1 (hereinafter, collectively referred to as "holographic gratings 511-1"), according to some embodiments. The footprint of the beam is stretched/projected to a larger beam size. A collimator 510 provides an illumination beam 523 that covers a wider length of holographic gratings 511-1 along a direction 501. Holographic gratings 511-1 generate a first expanded beam 524 having a dimension enlarged along direction 501.

Holographic gratings 511-1 direct the illumination beam towards a second optical element 511-2. Second optical element 511-2 may be a holographic grating or a blazed grating, or any other optical elements as disclosed herein to produce a 2D beam expansion directed to a display in a VR/AR headset, as disclosed herein (cf. displays 105 and 205). Holographic gratings 511-1 are formed by multiple dielectric layers having with alternating index of refraction $n_1$ and $n_2$, leading to an index delta, $\delta = n_2 - n_1$ that produces a reflection or transmission of incoming beam 523 into first expanded beam 524. In some embodiments, it is desirable that the value of $\delta$ be uniform along the direction of beam expansion (horizontal line 501). In yet other embodiments, the value of $\delta$ may grow along direction 501 for a non-uniform pupil of the VR/AR headset. Holographic gratings 511-1 may include Bragg diffraction layers oriented at a pre-selected angle 550 relative to the plane.

FIG. 5A illustrates a cross-sectional view of the operation of holographic grating 511A-1 in reflection mode. Holographic grating 511A-1 converts incoming beam 523 into first expanded beam 524 (e.g., 1D expansion) and directs it towards second optical element 511-2 in reflection mode.

FIG. 5B illustrates a cross-sectional view of the operation of holographic grating 511B-1 in transmission mode. Accordingly, holographic grating 511B-1 converts incoming beam 523 into first expanded beam 524 (e.g., a 1D expansion) and directs it towards second optical element 511-2.

Figure 6A:
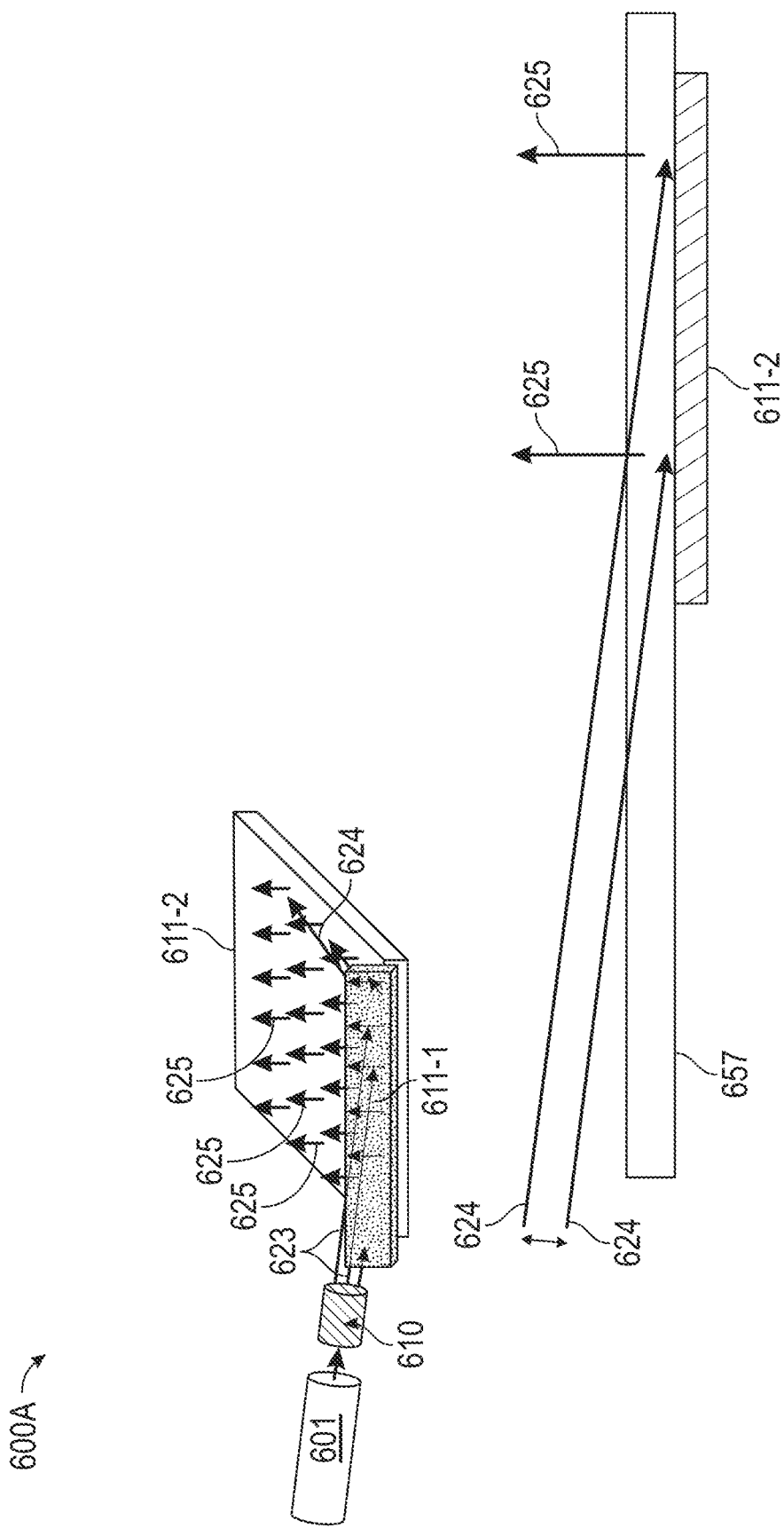
FIGS. 6A-6B illustrate exemplary embodiments of a 2D beam expander using a multiplex, holographic waveguide, according to some embodiments.
Figure 6B:
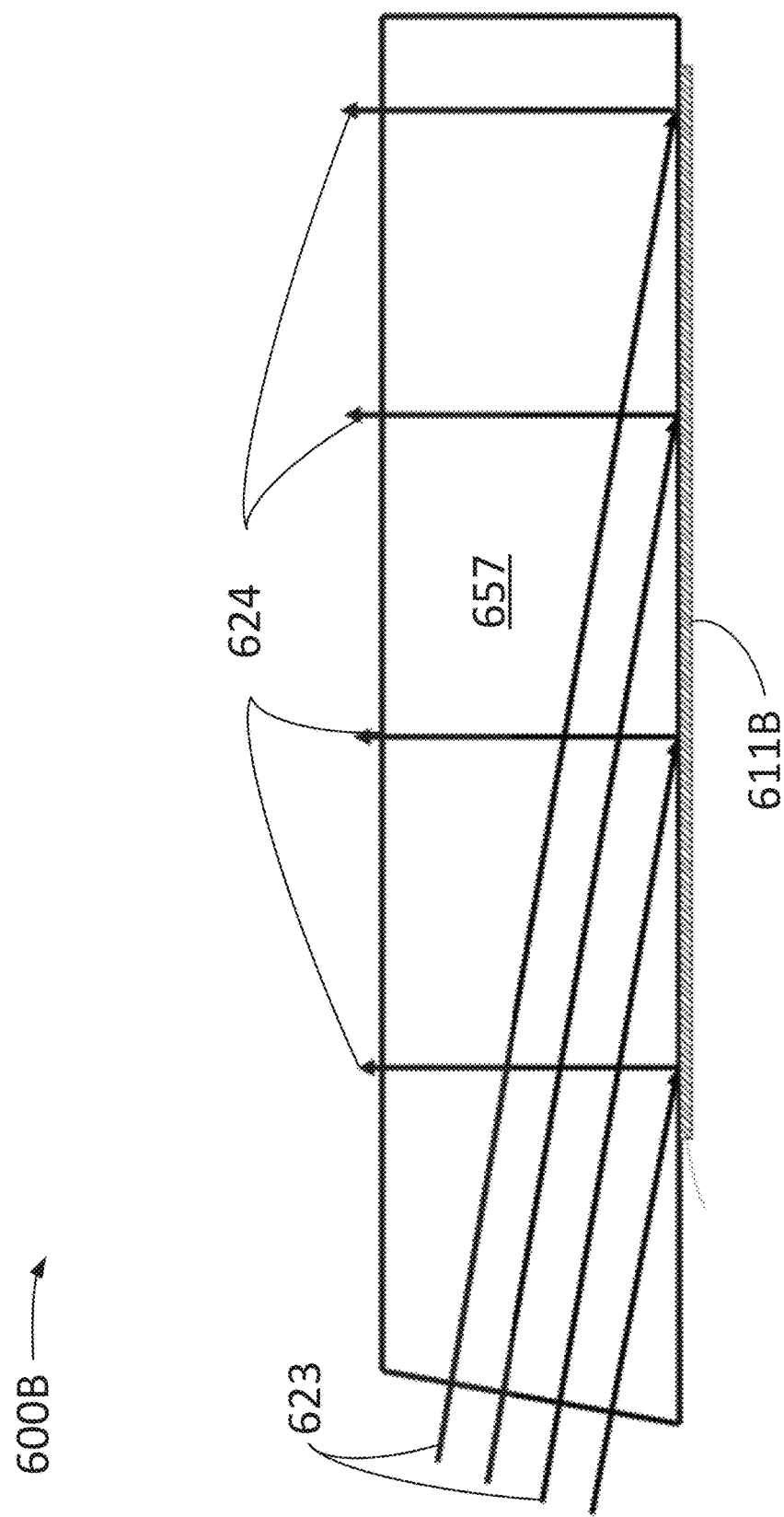

FIGS. 6A-6B illustrate exemplary embodiments of a 2D beam expanders 600A and 600B (hereinafter, collectively referred to as "beam expanders 600") using multiplex, holographic gratings 611B and 611-2, according to some embodiments. In some embodiments, it is desirable to use the multiplex capacity of holographic gratings 611B and 611-2 to combine the three different colors used in a pixelated display (e.g., Red, 668 nm, R, Green at 520 nm, G, and Blue, 450 nm, B). A collimated light beam 623 is provided by a light source 601 and a collimator 610. Light source 601 may be a white LED or a combination of RGB LEDs, or an RGB laser.

A first optical element 611-1 expands light beam 623 to generate a 1D-expanded beam 624. Multiplex holographic grating 611-2 converts 1D-expanded beam 624 into a 2D-expanded beam 625 (in reflection mode) provided in a second direction to a display of a VR/AR headset. Some embodiments may include a substrate 657 (e.g., a glass plate and the like) to protect holographic grating 611-2. An anti-reflective (AR) coating may be included on top of the glass to reduce reflection of the incoming beam on that surface. Note that the same 2D beam expansion effect can be realized having multiplex holographic grating 611-2 operating in transmission mode (cf. holographic grating 511B-1).

Multiplex holographic grating 611-2 may be Bragg reflectors having close to, or almost 100% diffraction-reflectivity, as a reflective Volume Bragg grating. Thus, each component of incoming beam 624 may reflect-diffract only once from grating 611-2.

Holographic beam expander 600B includes a holographic grating 611B having a collimated beam 623 edge-coupled to substrate 657 (e.g., a 2-4 mm thick transparent layer of glass or plastic) at close to normal incidence. This configuration improves throughput of beam expander 600B, and avoids the use of AR coating for top-in-coupling at large angle.

Figure 7:
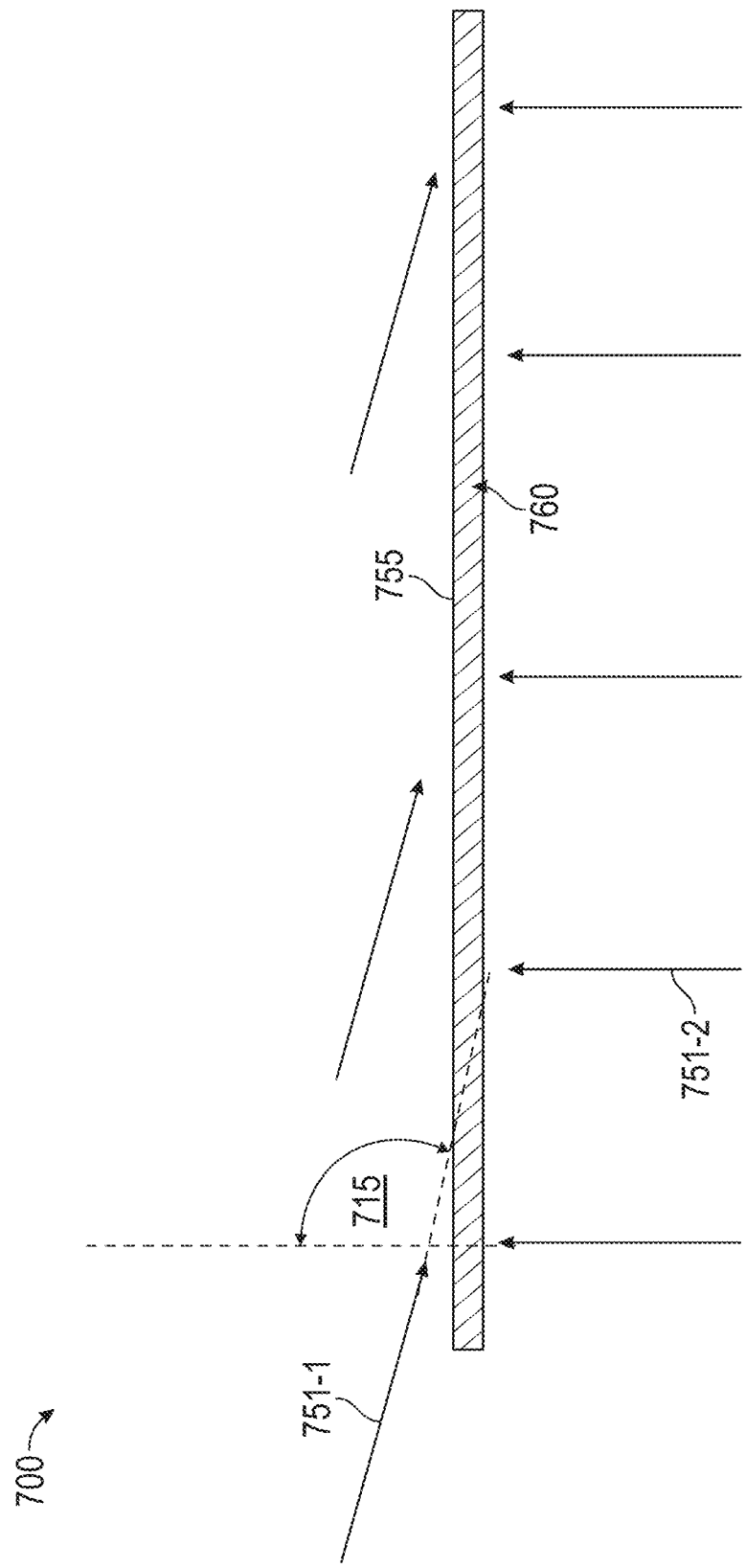
FIG. 7 illustrates a scheme for fabricating a multiplex holographic grating for use in a beam expander, according to some embodiments.

FIG. 7 illustrates a scheme 700 for fabricating a multiplex holographic grating or waveguide for use in a 2D beam expander for an enhanced reality headset, according to some embodiments. Accordingly, a multiplex, holographic waveguide may be formed by superimposing multiple pairs of beams 751-1 and 751-2 (hereinafter, referred to as "beam pair 751"), to form multiple interference patterns 755 on a photosensitive layer 760 (e.g., photopolymer), each pattern having different pitches. In some embodiments, interference patterns 755 may be oriented in the same directions (e.g., relative to the plane of photosensitive layer 760), although some embodiments may have different illumination patterns at different pitches, in different directions.

As photosensitive layer 760 is cured, it develops an index of refraction gradient between high/low intensity areas of interference pattern 755. Interference pattern 755 may be a standing wave profile formed on photosensitive layer 760 by the two coherent, interfering beams from beam pair 751. The illuminating beams may have a wavelength in the ultra-violet (UV) or visible region of the electromagnetic spectrum. Some photopolymers used in methods consistent with this disclosure are sensitive to green and blue light as well. The pitch of the illumination pattern is determined by the relative angle 715 between the beams in beam pair 751, and the orientation of the fringes is determined by the direction of a sum of the wavevectors from each of the beams in beam pair 751.

Figure 8:
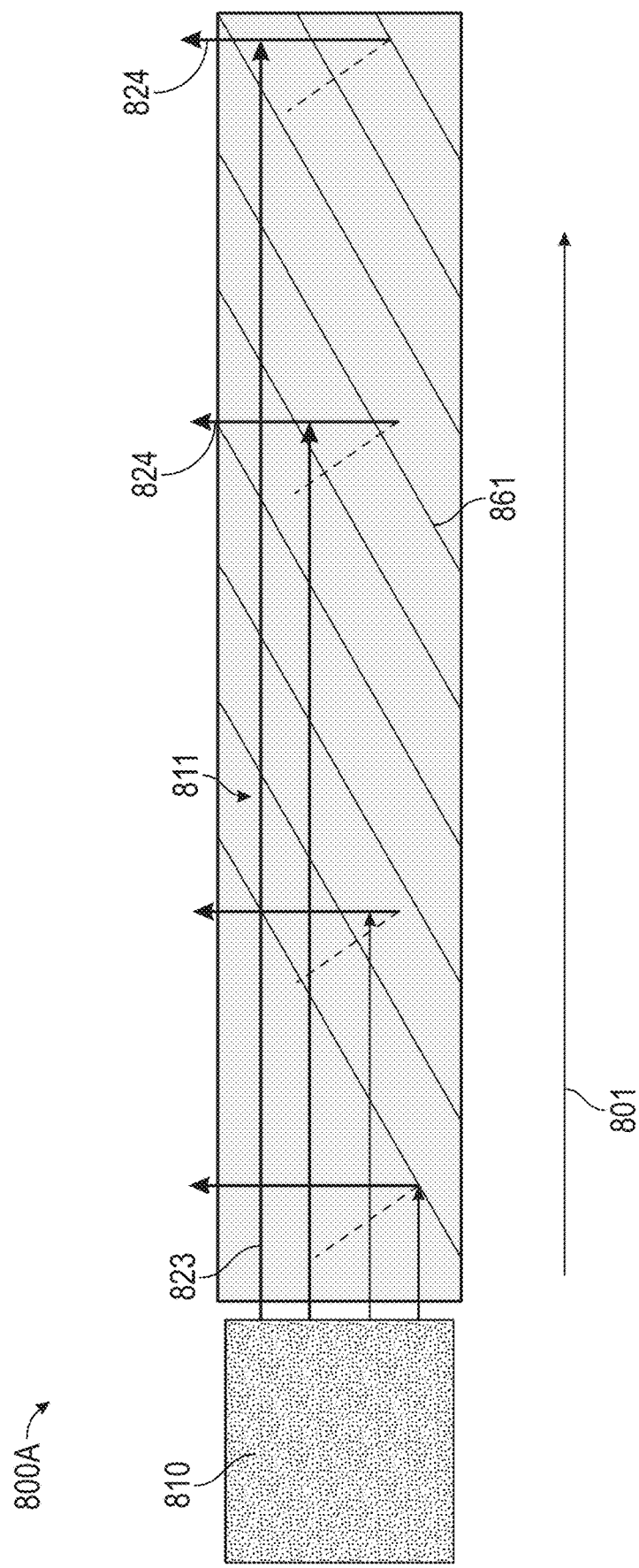
FIG. 8 illustrates a 2D beam expander using a planar waveguide embedded with partial reflectors, according to some embodiments.

FIG. 8 illustrates 2D beam expander 800 using a planar waveguide 811 embedded with reflectors 861, according to some embodiments. A collimator 810 provides an input beam 823 in a first direction is converted into an output beam 824 in a second direction. The footprint of input beam 823 is stretched/projected in a first dimension 801 with output beam 824 expanded at least in that dimension. Reflectors 861 may have a degree of reflectivity selected according to different applications. In some embodiments, reflectors 861 include a surface deposited with a broadband reflecting material such as aluminum, silver, or gold, in which case the reflecting surfaces have almost the same or similar reflection efficiency for three or more wavelengths in the visible, corresponding to an RGB (or any other) pixel configuration for a display. In some embodiments, reflectors 861 may include a diffraction Bragg stack of dielectric layers configured to reflect a selected amount of incoming light and transmit the rest through waveguide 811.

In waveguide beam expander 800, the reflectivity of each of reflectors 861 can be gradually increased towards the end of planar waveguide 811. For example, in some embodiments, the reflectivity of the last surface may be approximately 100%, thus ensuring that all, or almost all of the input beam 823 is expanded and directed out of the planar waveguide into output beam 824, as desired.

Figure 9:
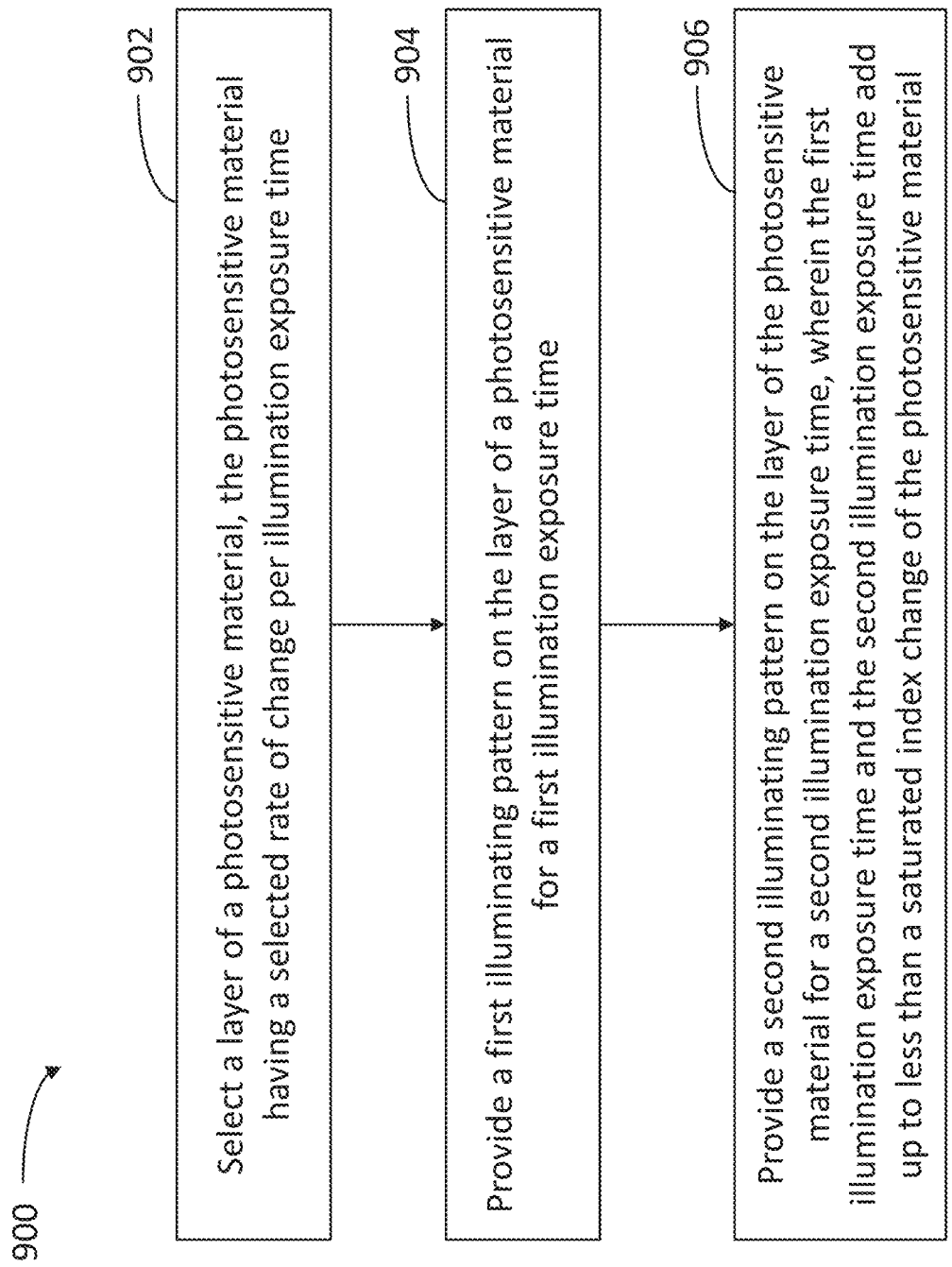
FIG. 9 is a flow chart illustrating steps in a method to make a beam expander for enhanced reality headsets, according to some embodiments.

FIG. 9 is a flow chart illustrating steps in a method 900 to make a beam expander for enhanced reality headsets, according to some embodiments. In some embodiments, methods consistent with the present disclosure may include one or more steps from method 900 performed in a different order, simultaneously, quasi-simultaneously, or overlapping in time.

Step 902 includes selecting a layer of a photosensitive material, the photosensitive material having a selected index rate of change per illumination exposure time. In some embodiments, the photosensitive material is responsive to light in the ultra-violet (UV) or visible range of the electromagnetic (EM) spectrum (e.g., with wavelength between approximately 290-600 nm).

Step 904 includes providing a first illuminating pattern on the layer of a photosensitive material for a first illumination exposure time. In some embodiments, step 904 includes selecting the first illumination pattern based on a Bragg diffraction pitch for a first wavelength corresponding to a first color in a pixelated display of an augmented reality headset.

Step 906 includes providing a second illuminating pattern on the layer of the photosensitive material for a second illumination exposure time. In some embodiments, the first illumination exposure time and the second illumination exposure time add up to less than a saturated index change of the photosensitive material. In some embodiments, step 906 includes selecting the second illumination pattern based on the Bragg diffraction pitch for a second wavelength corresponding to a second color in the pixelated display. In some embodiments, step 906 includes providing a third illumination pattern on the layer of a photosensitive material associated with a Bragg diffraction pitch for a third wavelength corresponding to a third color in a pixelated display for an augmented reality headset.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples, and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A device, including:
    a first optical element configured to receive a collimated beam input and to provide a first expanded beam in a first direction;
    a second optical element configured to receive the first expanded beam in the first direction and to provide a second expanded beam in a second direction to a display for an enhanced reality headset; and
    a phase plate layer configured to separate the collimated beam input into a plurality of light beams based on color, wherein the plurality of light beams are in a same direction and are directed into different portions of the display, and the phase plate layer is included in at least one of the first optical element or the second optical element.

2. The device of claim 1, wherein at least one of the first optical element or the second optical element includes one of a surface relief grating, a blaze grating, a holographic grating and a partial reflector.

3. The device of claim 1, wherein at least one of the first optical element or the second optical element includes an input surface relief grating, a planar waveguide, and an output surface relief grating, wherein a portion of the collimated beam input propagates through the first optical element or the second optical element along the planar waveguide.

4. The device of claim 1, wherein the first optical element has a width comparable to the collimated beam input and a length extending along the first direction.

5. The device of claim 1, wherein the second optical element has a width and a length comparable to a width and a length of a two-dimensional display in a display for an enhanced reality headset.

6. The device of claim 1, wherein at least one of the first optical element or the second optical element includes a diffraction grating blazed at an angle that enhances a diffraction efficiency at a selected wavelength, along the first direction or the second direction.

7. The device of claim 1, wherein the first optical element is configured to receive the collimated beam input at a grazing angle such that a length of the first optical element is illuminated.

8. The device of claim 1, wherein at least one of the first optical element or the second optical element is one of a reflective grating and a transmission grating.

9. The device of claim 1, wherein the display of the enhanced reality headset includes multiple pixels for three different colors, and at least one of the first optical element or the second optical element includes a multiplex holographic grating configured to provide the first expanded beam and the second expanded beam for the three different colors.

10. The device of claim 1, wherein at least one of the first optical element and the second optical element includes a planar waveguide divided by multiple partially reflecting surfaces embedded within the planar waveguide, the partially reflecting surfaces oriented at an angle based on the first direction or the second direction.

\* \* \* \* \*